US007733769B1

(12) United States Patent
Jennings et al.

(10) Patent No.: US 7,733,769 B1
(45) Date of Patent: Jun. 8, 2010

(54) METHOD AND APPARATUS FOR IDENTIFYING A MEDIA PATH IN A NETWORK

(75) Inventors: Cullen Jennings, Milpitas, CA (US); David R. Oran, Acton, MA (US); Shiva J. Shankar, Bangalore (IN); Vishal Kumar Singh, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 973 days.

(21) Appl. No.: 10/864,050

(22) Filed: Jun. 8, 2004

(51) Int. Cl.
*H04L 12/26* (2006.01)
*H04L 12/28* (2006.01)
*H04L 1/00* (2006.01)
*G06F 15/173* (2006.01)

(52) U.S. Cl. ................. 370/229; 370/230; 370/235; 709/223; 709/224

(58) Field of Classification Search ............ 370/395.21; 709/224, 226
See application file for complete search history.

(56) References Cited

U.S. PATENT DOCUMENTS 5,926,463 A * 7/1999 Ahearn et al. ............ 370/254

6,574,195 B2 * 6/2003 Roberts ..................... 370/235
7,032,031 B2 * 4/2006 Jungck et al. ............. 709/246

OTHER PUBLICATIONS

Braden et al., "Resource Reservation Protocol (RSVP)", Sep. 1997, Internet Engineering Taskforce (IETF) Network Working Group, RFC 2205, pp. 1-112.*
Terzis, "RSVP Diagnostic Messages", Jan. 2000, IETF, all pages.*
Goyal, "Integration of Call Signaling and Resource Management for IP Telephony" May-Jun. 1999, IEEE, all pages.*

* cited by examiner

*Primary Examiner*—Kwang B Yao
*Assistant Examiner*—Adam Duda
(74) *Attorney, Agent, or Firm*—Stolowitz Ford Cowger LLP

(57) ABSTRACT

Nodes in an Internet Protocol (IP) network receive probe packets configured to travel over particular IP media paths. The probe packets cause the network nodes to send media path reports to a logging system. The media path reports contain information identifying the different nodes in the media path. The logging system can reconstruct the network topology of a particular media path from the media path reports which can then be used for debugging purposes. In one embodiment the probe packets are Resource Reservation Setup Protocol (RSVP) packets configured for media path probing.

15 Claims, 7 Drawing Sheets

US 7,733,769 B1

METHOD AND APPARATUS FOR IDENTIFYING A MEDIA PATH IN A NETWORK

BACKGROUND

It is difficult to debug problems with speech quality, one way voice, or lost calls on the Internet and in enterprises spread over different locations. One reason for the difficulty is the large number of paths that a packet can take through the network. In the case of voice, the path a packet takes can determine if the call is intelligible by the voice call participants. This is due to the tight delay budget required for voice packets to travel end to end. Thus, a need exists for tracking the path of the voice traffic so that problems related to packet loss and packet delays can be identified. The problem becomes even more critical when the endpoints require video and lip synchronization.

A User Datagram Protocol (UDP) traceroute is currently used to identify problems in Internet Protocol (IP) networks. The UDP traceroute uses ephemeral source and destination ports and makes special use of the IP Time To Live (TTL) value. The TTL value in the traceroute is varied to isolate a trouble spot in the IP network. For example, the first traceroute packet may be sent with a TTL value of "1". The first node receiving the traceroute packet decrements the TTL value by one. As the TTL value is now zero, the first node sends a fault notice back to the source.

A second traceroute packet is sent with a TTL value of "2". The source expects a fault notice back from a second node receiving the traceroute packet. However, if the fault notice comes back from the first node, or if no fault notice comes back, then a trouble spot in the network can be isolated somewhere between the first node and second node.

The UDP traceroutes are not effective in detecting network problems for IP media streams. This is because the UDP traceroute packets do not necessarily travel along the media path used by the IP media stream. It does no good identifying a problem node in a network, if the identified node is not used in the media stream path.

The UDP traceroute packets also cannot pass through firewalls that may exist between a source endpoint and a destination endpoint for the media session. Since UDP traceroute packets may not be able to travel the entire path from the source endpoint to the destination endpoint, they are unreliable for analyzing the entire media path for IP media streams.

The present invention addresses this and other problems associated with the prior art.

SUMMARY OF THE INVENTION

Nodes in an Internet Protocol (IP) network receive probe packets configured to travel over particular IP media paths. The probe packets cause the network nodes to send media path reports to a logging system. The media path reports contain information identifying the different nodes in the media path. The logging system can reconstruct the network topology of a particular media path from the media path reports which can then be used for debugging purposes. In one embodiment the probe packets are Resource Reservation Setup Protocol (RSVP) packets configured for media path probing.

The foregoing and other objects, features and advantages of the invention will become more readily apparent from the following detailed description of a preferred embodiment of the invention which proceeds with reference to the accompanying drawings.

DETAILED DESCRIPTION

Figure 1:
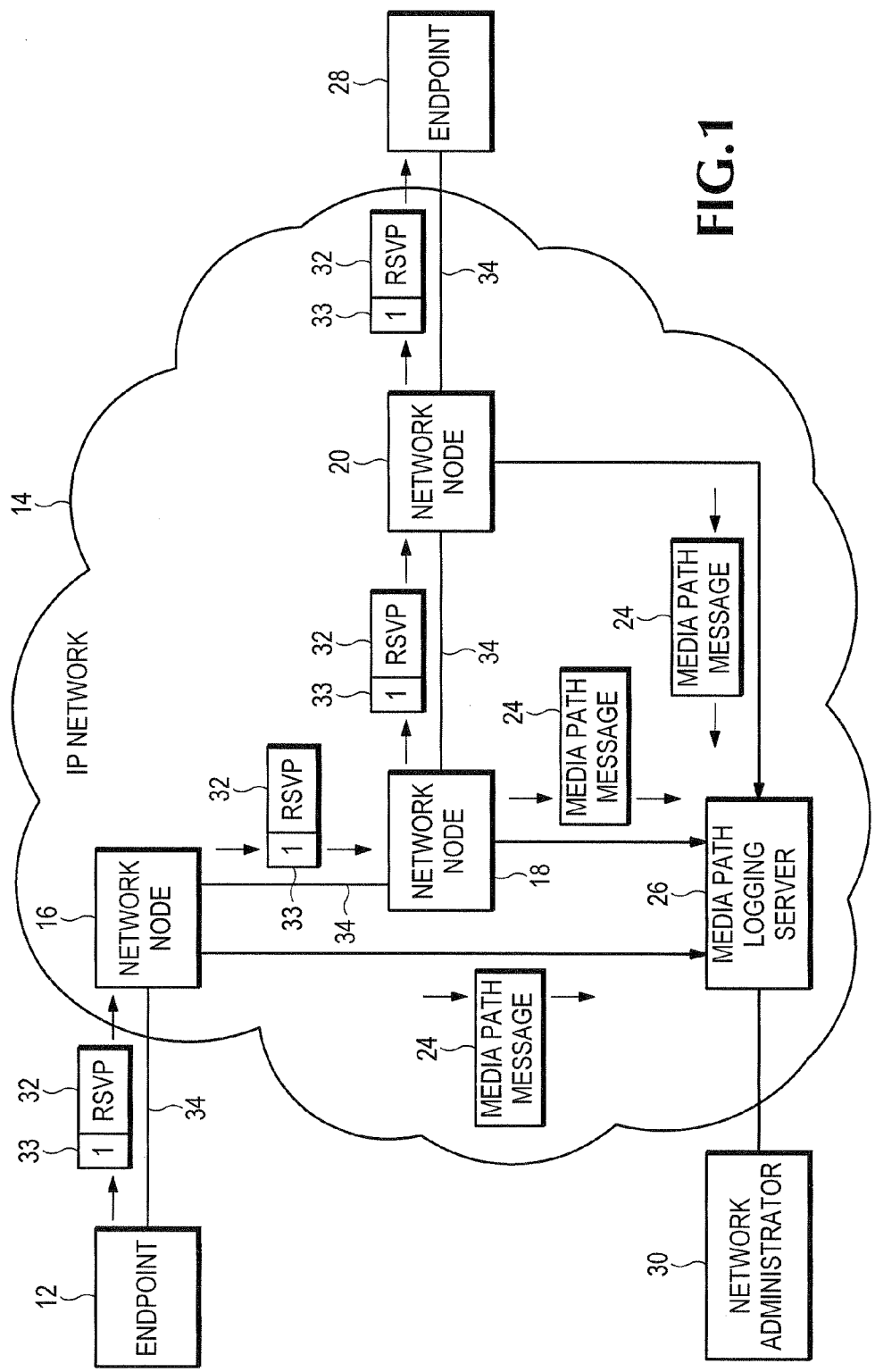
FIG. 1 is a diagram of a network that uses RSVP probe packets to identify a media path.

FIG. 1 shows an Internet Protocol (IP) network 14 that uses Resource Reservation Setup Protocol (RSVP) probe packets 32 to identify a media path 34. The RSVP probe packet 32 has essentially the same header information and format as a conventional RSVP packet. Therefore, the RSVP probe packet 32 will travel along the same media path 34 as media packets that are carrying a media payload. However, a field 33 in the RSVP probe packet 32 is set to a particular value that distinguishes the packet from conventional RSVP packets.

The IP network 14 includes multiple intermediate network nodes 16, 18 and 20 that transport an Internet Protocol (IP) media stream or media flow between endpoints 12 and 28. The intermediate network nodes 16, 18 and 20 each receive the RSVP probe packet 32, but do not maintain any soft state associated with conventional resource reservation. Instead, the intermediate network nodes 16, 18, and 20 send out media path messages 24 to a logging server 26.

The media path messages 24 are correlated by the logging server 26 and the correlated information used to identify the network topology for media path 34. The media path information can then be used for further QoS analysis. For example, a computer 30 used by a network administrator can access the logging sever 26 to identify the network devices used for particular media flows that have been identified as having QoS problems. In another embodiment, the endpoints 12 or 28 access the media path information stored in the logging server through the IP network 14.

One application for the RSVP probe packets 32 is for identifying media paths used with the Real Time Transport Protocol (RTP), which is described in RFC 3550. The RTP protocol is used for carrying a real time media stream over the IP network 14. The media stream carried on media path 34 can contain any type of real time media, including audio, video, real time text transmission, or voice-band data such as fax or modem information.

However, the probe packets 32 can be used for identifying any type of media path in any network. It should also be understood that one preferred embodiment uses RSVP formatted packets for traversing the media path 34. However, any type of resource reservation packet, media packet, or any other type of packet that is formatted to traverse the media path 34 can be used for causing the intermediate nodes 16, 18, and 20 to send media path messages 24 to logging server 26.

The endpoints 12 and 28 can be any combination of hardware and software used for receiving or sending a media stream and establishing a media path 34 in the IP network 14. For example, the endpoints 12 and 28 may comprise voice gateways that receive calls on behalf of other devices. The gateway endpoint can establish IP media sessions on behalf of Plain Old Telephone Service (POTS) phones, Private Branch Exchanges (PBXs), etc. The endpoints 12 or 28 could alternatively be Voice Over Internet Protocol (VoIP) phones or computers coupled directly to the IP network 14.

The intermediate nodes 16, 18, and 20 can be any type of network processing devices that forward IP packets over the IP network 14. For example, the intermediate nodes can be routers, switches, gateways, servers, computers, etc. The media path logging server 26 can be any type of network device that is capable of receiving the media path messages 24 over the IP network 14, correlating the media information in the messages, and sending the results back over the IP network 14 to requesting devices.

Any of the endpoints, intermediate nodes and the logging server can be wireless devices that communicate with other network devices using wireless communication links such as wireless communication links that use the IEEE 802.11a/b/g wireless communication standards.

Figure 2:
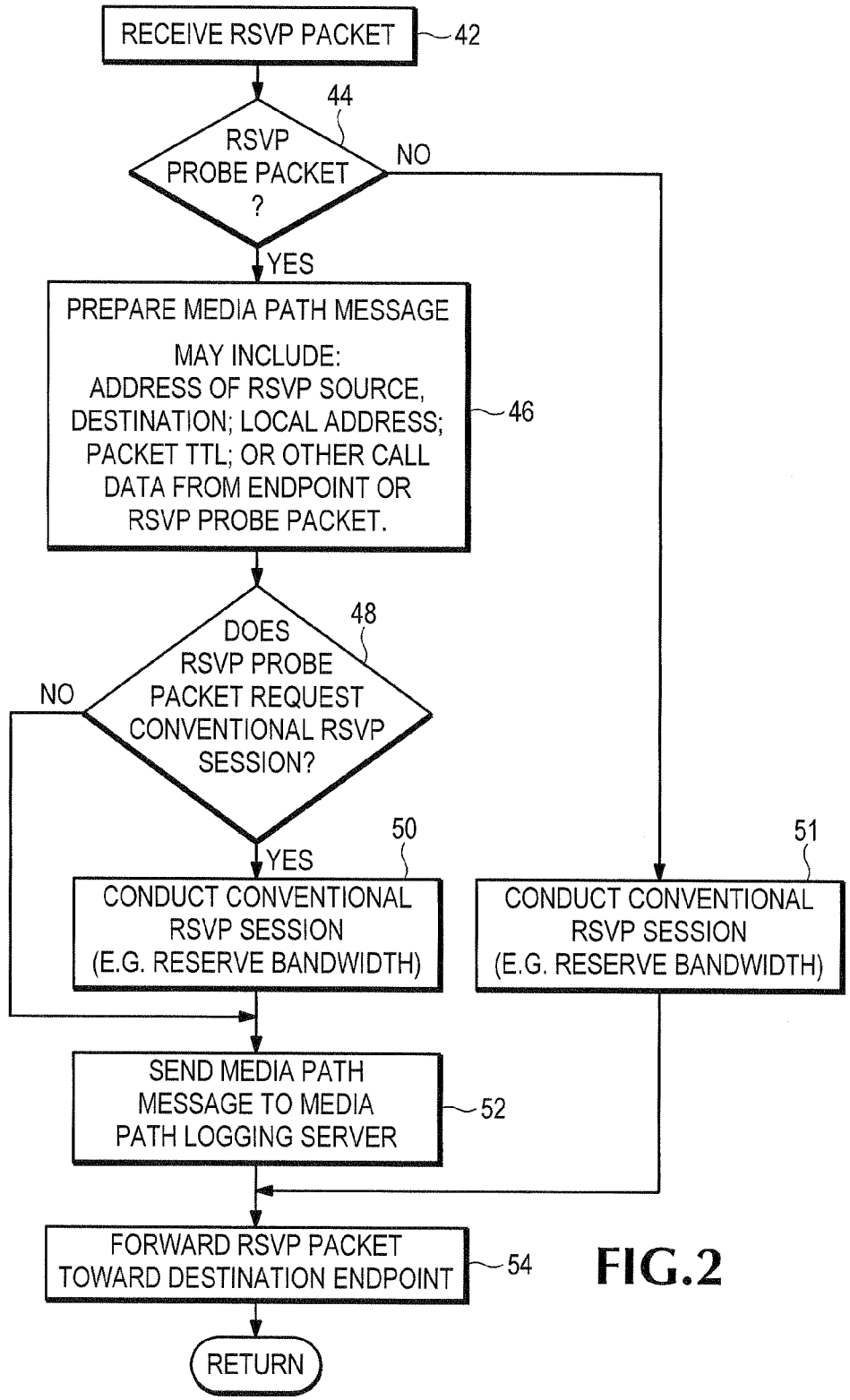
FIG. 2 is a flow diagram showing in more detail how intermediate nodes in the media path process the RSVP probe packets.

FIG. 2 shows in more detail the operations performed by the intermediate nodes 16, 18 or 20 in FIG. 1. In block 42 the intermediate node receives a RSVP packet and determines in block 44 whether or not the RSVP packet is a RSVP probe packet 32 as described above in FIG. 1. The intermediate node may determine the received packet is a RSVP probe packet by checking the value in a particular field 33.

If the RSVP field does not include the predetermined value, the intermediate node processes the RSVP packet in a conventional manner in block 51 by conducting a RSVP session with the endpoint originating the RSVP packet. The intermediate node then forwards the conventional RSVP packet toward a destination endpoint in block 54.

If the RSVP packet has the tag associated with RSVP probe packets, the intermediate node prepares a media path message in block 46. The media path message or report prepared in block 46 can include any variety of information needed to associate the intermediate node with a particular media flow. For example, the intermediate node may identify a particular media flow by inserting the source and destination IP addresses and port numbers and the protocol (e.g., UDP) from the RSVP packet into the media path message. The intermediate node can also include its own local domain name and IP address.

The media path message can also include any other information contained in the RSVP probe packet or any other media path status information maintained by the intermediate node. For example, the intermediate node may insert QoS problem descriptors in the media path that are sent in the RSVP probe packet. The intermediate node can also insert local load or state information in the media path message.

The RSVP probe packet can also include other information such as the IP address of the logging server where the intermediate needs to send the media path message or an IP address for a call server processing the call signaling for the media session. In another embodiment, the intermediate nodes are preconfigured with the IP address of the logging server 26. The intermediate node could also assign priority values to the media path messages that notify the logging server how to prioritize the media path messages or when to notify other network elements of the media path messages.

The intermediate node may also include a Time To Live (TTL) value from the RSVP probe packet in the media path messages. The TTL value is automatically decremented by each intermediate node that receives the RSVP probe packet. See copending application entitled: METHOD AND APPARATUS FOR ANALYZING A MEDIA PATH FOR AN INTERNET PROTOCOL (IP) MEDIA SESSION, Ser. No. 10/807,784, filed Mar. 9, 2004.

By sending the TTL value in the media path message, the logging server 26 (FIG. 1) can determine the order that intermediate nodes receive the same RSVP probe packet. For example, the intermediate node sending a media path message with a highest TTL value may be the first network device receiving the RSVP probe packet. The intermediate node sending a media path message with a TTL value one less than the highest TTL value may be the second intermediate node receiving the RSVP probe packet, etc.

The RSVP probe packet in block 48 may include some flag that notifies the intermediate node to conduct a conventional RSVP session, in addition to generating the media path message. For example, the field 33 (FIG. 1) in the RSVP header may use a first predetermined value to cause the intermediate node to generate the media path message. A second predetermined value in field 33 may cause the intermediate node to send the media path message and also conduct any conventional RSVP operations requested in the RSVP packet.

In one example, the intermediate node may reject the conventional RSVP requests based on certain local bandwidth limitations. This rejection information may then be included in the media path messages sent to the logging server.

If the RSVP probe packet in block 48 requests the intermediate node to also conduct RSVP, the intermediate node conducts whatever conventional RSVP operations are requested in the RSVP probe packet in block 50 before sending the media path message to the logging server in block 52. Conventional RSVP operations are known to those skilled in the art and are therefore not described in further detail.

If the RSVP probe packet in block 48 does not request the intermediate node to conduct a RSVP session in block 48, the intermediate node skips the RSVP session in block 50 and sends the media path message to the logging server in block 52. The RSVP probe packet is forwarded toward the destination endpoint in block 54.

Figure 3:
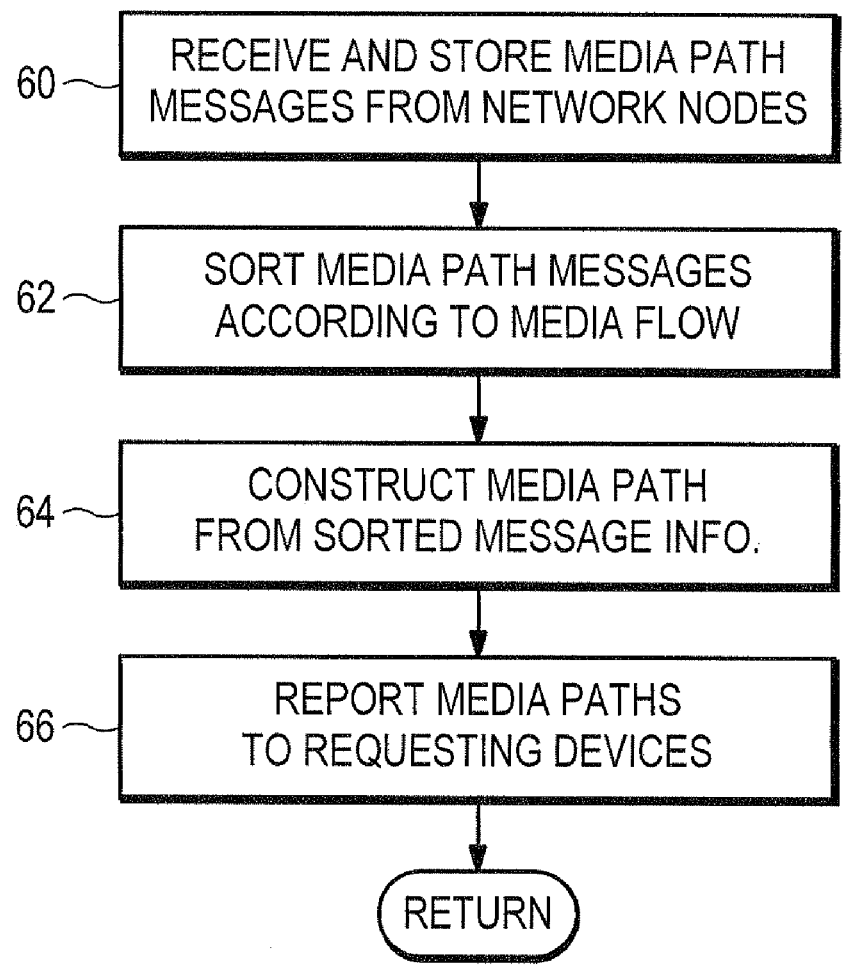
FIG. 3 is a flow diagram showing how a logging server processes media path messages received from the intermediate nodes.

FIG. 3 is a flow diagram describing in more detail some of the operations performed by the logging server 26 (FIG. 1) that receives the media path messages from the intermediate nodes. The logging server receives and stores media path messages from the intermediate nodes in block 60. One aspect of the system to note is that the logging server 26 may not be located in the media path that is being analyzed. This allows the intermediate nodes to send the media path messages to the logging server without increasing congestion in the media path.

In one example, the media path messages may be system log (syslog) messages. Syslog is described in RFC 3164. However, the media path messages can be sent in any format and contain any information necessary to identify the media path. Alternative ways to relay the media path information to the logging server can include using a CallManager or Session Initiation Protocol (SIP) process. Alternatively, the intermediate nodes could send email messages to the logging server that contain the media path information.

The logging server sorts the media path messages in block 62. In one example, the logging server sorts the media path messages according to media path flows. For example, the logging server may group the media path messages having the same originating endpoint address and destination endpoint address.

The logging server in block 64 may then construct the media path topology for the related media path messages and identified network nodes. One way to construct the media path is to use the TTL information that may be included in the media path messages. This is explained above where the logging server orders the addresses for the intermediate nodes according to their associated TTL values. The intermediate node with the largest TTL value is identified as the first network node to receive the associated RSVP probe packet. The intermediate node having a next decremented TTL value is identified as the second node to receive the same RSVP probe packet, etc.

Other types of sorting are also possible. For example, the logging server may identify all the media path messages generating a RSVP failure message. The logging server could also identify all the media path messages sent by the same intermediate node, sent by a same set of intermediate nodes, or all network media paths associated with a same source or destination endpoint. The logging server may also sort the media path messages according to associated timestamps that are generated by the source endpoint, the intermediate nodes, or both.

In block 66, the logging server reports out any requested media path information. The media path information can be requested by any authorized device. For example, the logging server information may be requested by a third party computer 30 (FIG. 1) operated by a network administrator or by the source or destination endpoint. It is also possible that some or all of the sorting is conducted by the requesting device instead of the logging server.

The logging server can be programmed to automatically and periodically send out the media path information associated with particular network nodes to preconfigured locations. For example, the logging server may be configured to track and periodically report out all media path information associated with a particular intermediate node to a pre-identified network address.

The logging server can also be programmed to automatically report out information to particular devices when a certain type of network problem is identified. For example, it may be determined that all media paths terminate that reach a particular intermediate node. In this example, the logging server may determine that RSVP probe packets are never forwarded toward the destination endpoint by a particular intermediate node. The logging server may be programmed to send a notification to a particular IP address when the media path termination condition is detected.

Figure 4:
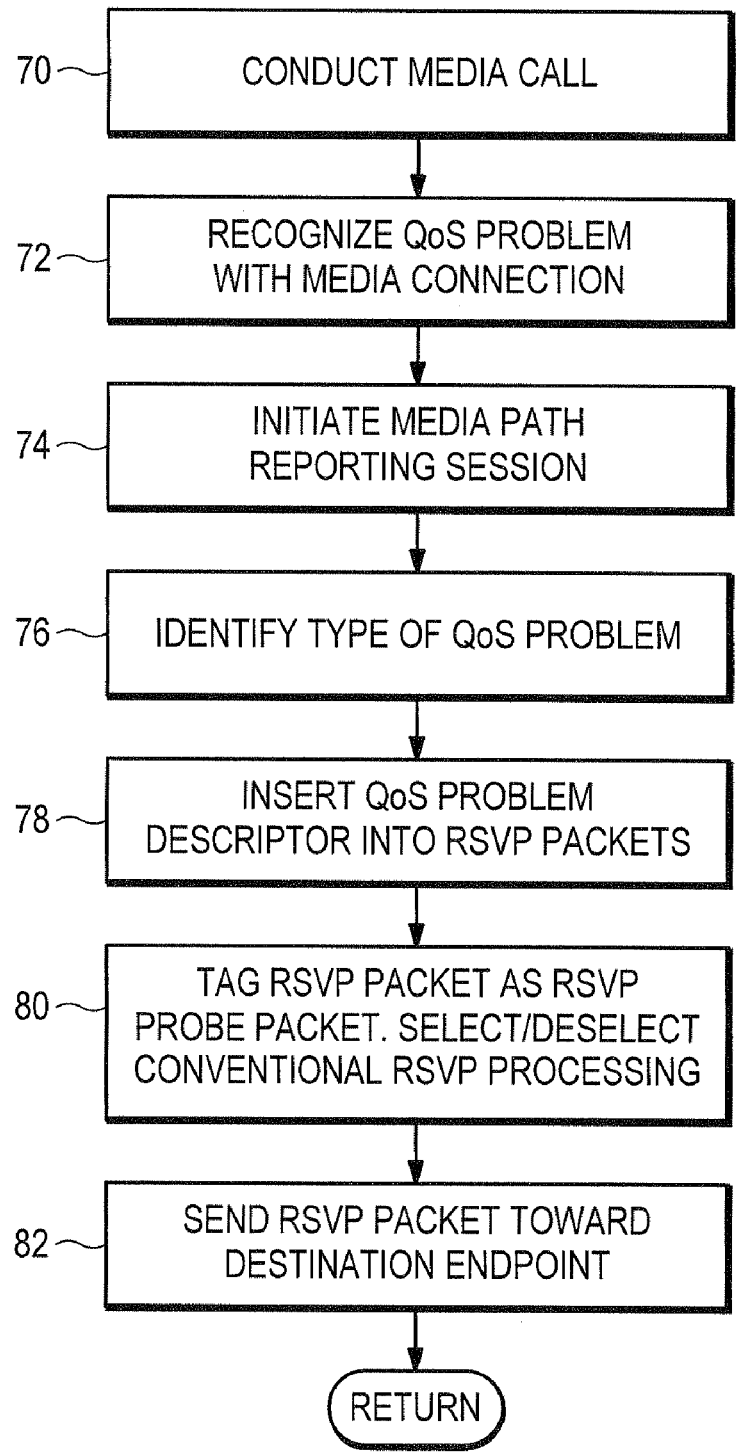
FIG. 4 is a flow diagram showing how an endpoint generates the RSVP probe packets.

FIG. 4 shows one example of operations conducted by one of the endpoints initiating one or more of the RSVP probe packets. In block 70 the endpoint, such as a computer, VoIP phone, Plain Old Telephone Service (POTS) analog phone, gateway, router, switch, etc., conducts a media call with another endpoint. The endpoint, or the user at the endpoint, may recognize a QoS problem in block 72. For example, the endpoint may receive Real Time Control Protocol (RTCP) feedback reports back from the destination endpoint indicating packet loss or quality degradation. In an alternative embodiment, the user at the endpoint may notice a quality problem such as jitter, echo, voice or video dropouts, one way audio, etc., in the media connection.

If the QoS problem is recognized in block 72, a media path reporting session is initiated in block 74. The media path reporting session may be automatically initiated by the endpoint or manually initiated by the endpoint user. The session could be manually initiated by the user typing in a command at an endpoint computer or pressing a series of buttons on an endpoint device, such as pressing keys on a phone keypad.

In block 76, the endpoint may identify particular types of QoS problems. If the session is automated, the endpoint may automatically identify the QoS problems from the RTCP report and insert the RTCP information in the RSVP probe packet. In a manually initiated media path reporting session, the endpoint operator may be presented with certain QoS problem descriptors. For example, after manually initiating the media path reporting session at the endpoint, a display device 104 (FIG. 10) on the computer, phone or other endpoint device, may query the user to select between several types of possible QoS problems. The display screen 104 on the endpoint may present several QoS descriptor options, such as jitter, echo, voice dropout, etc. The endpoint user then selects one or more of the displayed QoS problem descriptors.

The endpoint inserts the automatically generated or manually selected QoS descriptors into the RSVP probe packet in block 78. The endpoint in block 80 generates the header information necessary for generating a RSVP packet and sets a tag in the RSVP packet that notifies the intermediate nodes that the packet is a RSVP probe packet.

The endpoint in block 80 optionally may request the intermediate nodes to also conduct a conventional RSVP session using the RSVP probe packet as described above in FIG. 2. The endpoint may select this option by inserting a particular predetermined value into the RSVP header. In block 82, the endpoint sends the RSVP probe packet towards the destination endpoint.

In one implementation, a media path reporting session is also automatically conducted by the endpoint prior to recognizing a QoS problem. For example, the endpoint may automatically send out a RSVP probe packet at the beginning of the media call or periodically send out RSVP probe packets during an established call. This allows the logging server to compare the media path for a normally operating call with the media path identified for a media call with a QoS problem.

Figure 5:
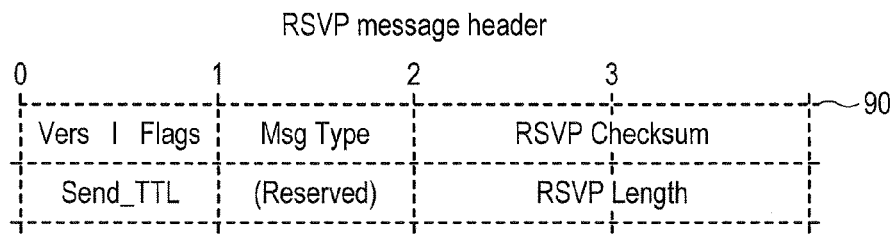
FIGS. 5-9 are diagrams of RSVP probe packets.
Figure 6:
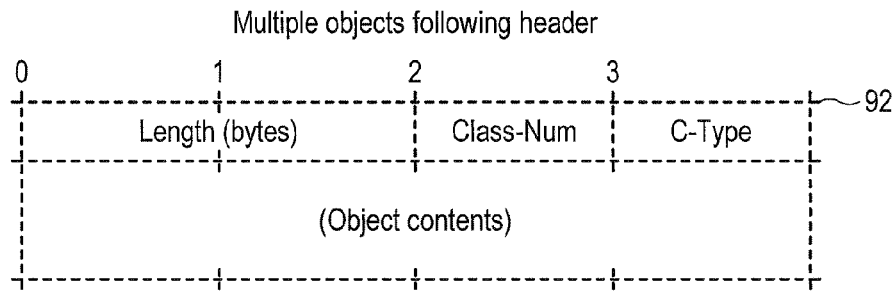
Figure 7:
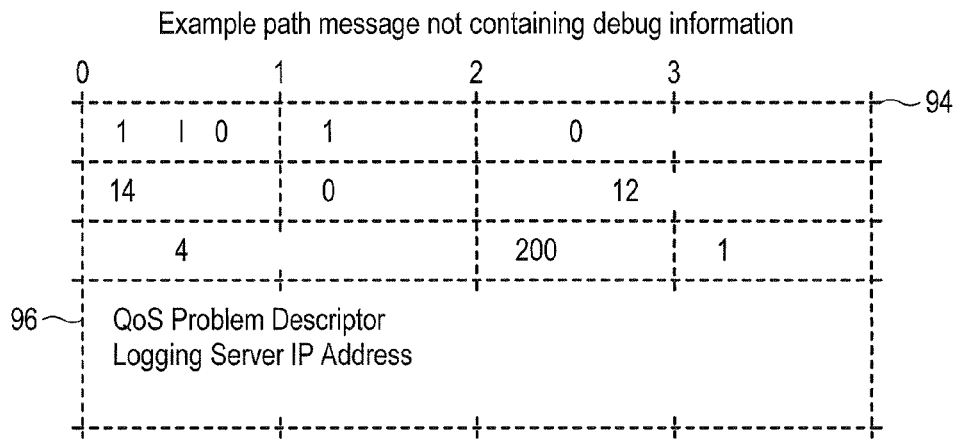

FIGS. 5-9 show examples of how a RSVP packet is modified to generate RSVP probe packets. It should be noted however that other fields, other values, and other techniques can be used to notify the intermediate nodes of the RSVP probe packet. The RSVP protocol is defined in RFC 2205 which is herein incorporated by reference. A RSVP message header 90 is shown in FIG. 5. FIG. 6 shows one of possibly multiple objects 92 that may follow the RSVP header 90. The RSVP header 90 includes a Version field (Vers), a flag field (Flags), a message type field (Msg Type), a RSVP checksum field, a TTL field (Send_TTL), a reserved field, and a RSVP length field. The object 92 includes a length field, a class number field, a C-type field and the object contents. All these fields are known to those skilled in the art and therefore are not described in further detail In one approach, a new class object is defined that identifies the RSVP probe packet. The Class-num field is set to a predetermined number that is not currently in use for other RSVP operations that defines the new class object for the RSVP probe packet. Each intermediate node that detects the predetermined number in the Class-Num field identifies the RSVP packet as a RSVP probe packet and accordingly generates media path messages as described above.

In one embodiment, the highest order two bits of the Class-Num field are set to 11 so intermediate nodes that do not understand this extension forward the RSVP packet. In one example shown in FIG. 7, the value 200 is used in the Class-Num field to identify the RSVP probe packet 94. The C-Type field in FIG. 7 could be any number. For example, the value 1 is used in RSPV probe packet 94.

The contents of the object field 96 may contain a string of debug information as described above or may be empty. Any debug information in object field 96 is sent to the logging server 26 by the intermediate node receiving the RSVP probe packet.

Figure 8:
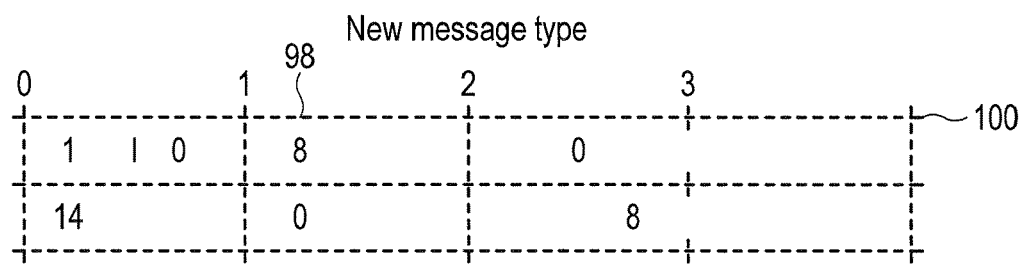
Figure 9:
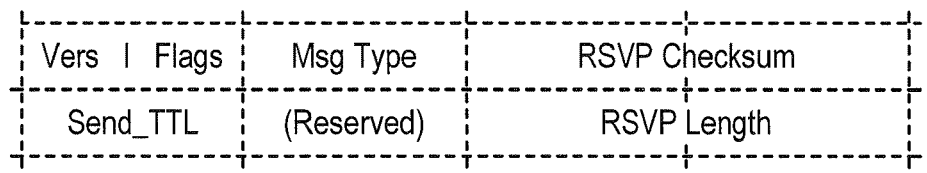

FIG. 8 shows another embodiment where the message type field 98 for a RSVP header 100 is used for defining the RSVP probe packet. A currently unused unique value is used in field 98 to identify the RSVP probe packets. For example, the value eight is used in FIG. 8. FIG. 9 shows the names of the RSVP fields for reference purposes.

Figure 10:
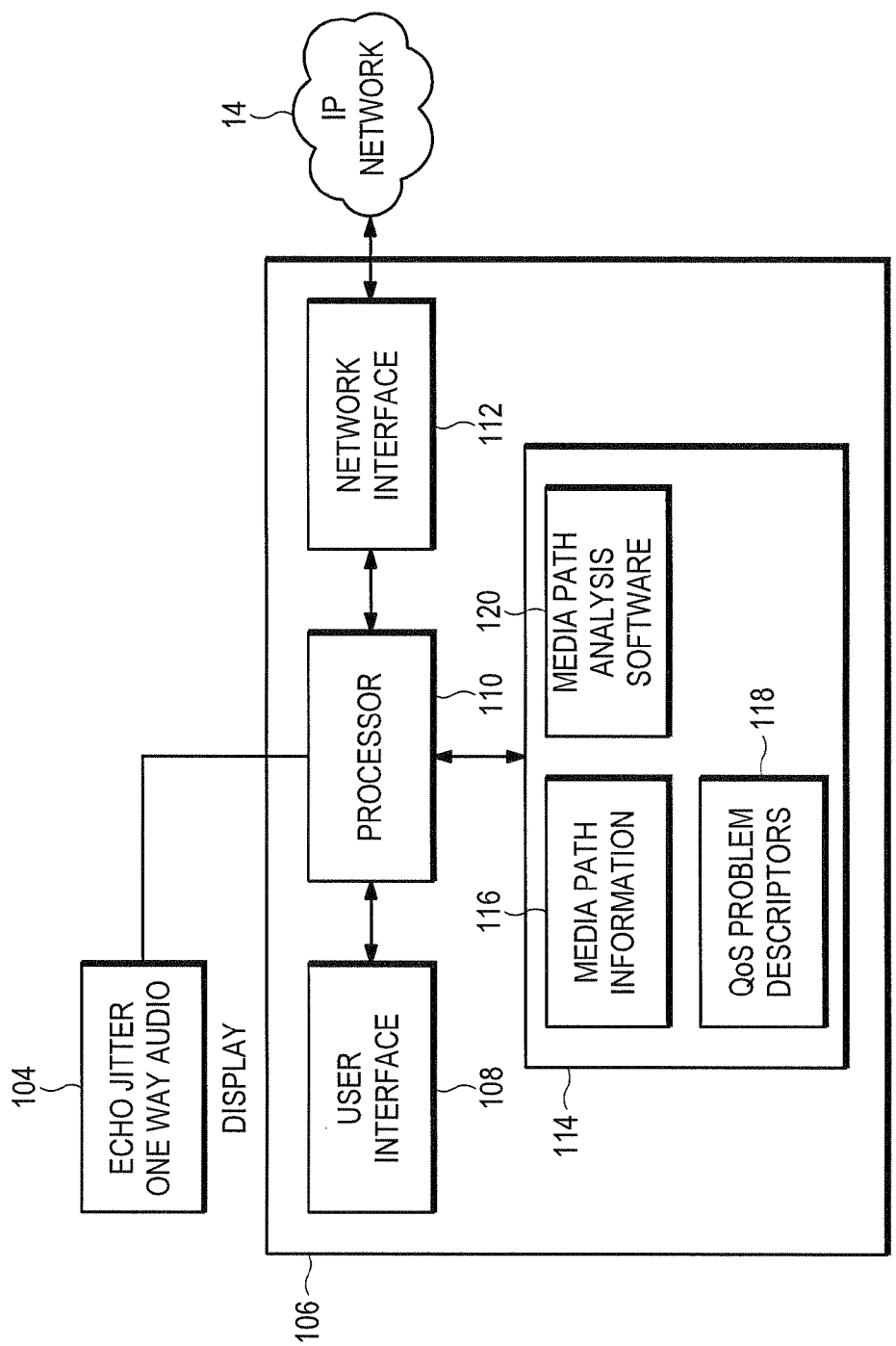
FIG. 10 is a detailed block diagram of an endpoint, intermediate node, or logging server.

FIG. 10 shows in more detail the circuitry in the endpoint, intermediate nodes or logging server used for conducting the media path analysis described above. The network device 106 includes a processor 110 that accesses a memory 114. The device 106 includes a network interface 112 for communicating over the IP network 14. The endpoint, intermediate node, or logging server contain media path analysis software 120 in memory 114 necessary to conduct the operations described above.

For the endpoints 12 or 28 (FIG. 1), a user interface 108 may be provided for initiating the RSVP probe packets. The user interface 108 may be a phone keypad or a computer keyboard. In the example where the endpoint allows the user to identify types of QoS problems, the possible QoS problems may be presented to the user as a menu on display 104. The user selects one of the menu options which is then stored as a QoS problem descriptor 118 in memory 114 for inserting into the object field 96 (FIG. 7) of the RSVP probe packet. The endpoints include other media path information 116 in the RSVP probe packet, such as source and destination IP addresses.

For the intermediate nodes 16, 18 and 20 (FIG. 1), the media path information 116 is input into the media path messages and sent to the logging server over network interface 112. The media path information 116 may include a local intermediate node IP address and RSVP failure notices. The media path information 116 may also include information extracted from the received RSVP probe packets.

For the logging server 26 (FIG. 1), the media path information 116 and QoS problem descriptors 118 include any information received from the media path messages. As described above, the logging server may then sort the media path information 116 according to identified media flows.

The media path analysis system is scalable and does not introduce a big burden on the IP network. Another advantage is that the media path messages are sent to a logging server that may not necessarily be in the media path. This prevents the media path messages from having to travel along the media path and possibly causing congestion in the media path. The system is an accurate non-intrusive means for tracing a speech or video path.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

The invention claimed is:

1. A method for identifying a media path in a packet switched network, comprising:
   receiving media path packets at an intermediate node located in the media path in-between a source of the media path packets and a destination for the media path packets, the media path packets configured as conventional media path reservation packets used for reserving resources along the media path and further configured to travel along the same media path as packets containing media;
   identifying the media path packets configured as media path probe packets at the intermediate node;
   sending a media path report distinct and separately from the media path probe packets directly from the intermediate node to a logging node located outside of the media path, the media path report identifying information about the media path;
   automatically sending the media path report independently from any initiation from the logging node whenever one of the media path probe packets is received by the intermediate node and sending the media path report separately from other media path reports produced and sent from other nodes forming the media path;
   monitoring the media path probe packet for a resource reservation indicator;
   forwarding the media path probe packet toward a destination endpoint without conducting a resource reservation protocol when no resource reservation indicator is identified; and
   conducting the resource reservation protocol before forwarding the media path probe packet toward a destination endpoint when the resource reservation indicator is identified.

2. The method according to claim 1 including independently sending media path reports directly from multiple different intermediate nodes located along the media path in the packet switched network to the logging node while the multiple different intermediate nodes continue to forward the media path probe packet along the media path.

3. The method according to claim 2 including sending the media path reports to the logging node at an address in the packet switched network that is not in the media path and is not a source or destination endpoint for the media path probe packets.

4. The method according to claim 1 including using Resource Reservation Setup Protocol (RSVP) packets as the media path probe packets.

5. The method according to claim 4 including identifying a predetermined value in a RSVP field to distinguish RSVP probe packets from other RSVP packets.

6. The method according to claim 1 including inserting a source and destination address from the media path probe packet into the media path report to identify a media flow.

7. The method according to claim 1 including inserting a Time To Live (TTL) value from the media path probe packet into the media path report.

8. The method according to claim 1 including adding a Quality of Service (QoS) problem descriptor from the media path probe packet into the media path report, the QoS problem descriptor being inserted when the media probe packet is originated and before the media path probe packet is forwarded to the intermediate node.

9. A network processing device, comprising:
   a processor receiving a media path configuration packet including a reporting indicator, the processor on detecting the reporting indicator sending a message distinct from said configuration packet to a logging server to identify media path information for the media path configuration packet,
   wherein the processor sends the message to the logging server at an Internet Protocol (IP) address that is not in a media path for the media path configuration packet and not the IP address of a network device originating the media path configuration packet and wherein the processor monitors the media path configuration packet for a media reservation request and conducts a Resource Reservation Setup Protocol (RSVP) prior to forwarding the media path configuration packet toward a destination endpoint when the media reservation request is detected and does not conduct a Resource Reservation Setup Protocol (RSVP) prior to forwarding the media path configuration packet toward a destination endpoint when the media reservation request is not detected.

10. The network processing device according to claim 9 wherein the media path configuration packet is a Resource Reservation Setup Protocol (RSVP) probe packet and wherein the processor conducts any identified resource reservation protocol and inserts Quality of Service (QoS) problem descriptors from the RSVP probe packet into the message sent to the logging server.

11. The network processing device according to claim 9 wherein the processor includes a source and destination address from the media path configuration packet in the message.

12. The network processing device according to claim 9 wherein the processor includes an address in the message for a call server processing call signaling for a media path associated with the media path configuration packets.

13. The network processing device according to claim 9 wherein the processor:
  automatically sends the message whenever one of the media path configuration packets with the reporting indication is received; and
  sends the message independently from any initiation from the logging server and separately from other messages produced and sent from other nodes forming the media path.

14. The network processing device according to claim 9 wherein the reporting indicator is a class object in a Resource Reservation Setup Protocol (RSVP) packet.

15. The network processing device according to claim 14 wherein the processor inserts the media path information contained in the object field of the RSVP packet into the message sent to the logging server.

* * * * *